United States Patent
Fadeev et al.

(10) Patent No.: US 6,423,119 B1
(45) Date of Patent: Jul. 23, 2002

(54) POLY (1-TRIMETHYSILYL-1-PROPYNE) MEMBRANE REGENERATION PROCESS

(75) Inventors: Andrei G. Fadeev, Santa Fe, NM (US); Michael M. Meagher, Lincoln, NE (US)

(73) Assignee: The Board of Regents of the University of Nebraska, Lincoln, NE (US)

( * ) Notice: Subject to any disclaimer, the term of this patent is extended or adjusted under 35 U.S.C. 154(b) by 0 days.

(21) Appl. No.: 09/611,742

(22) Filed: Jul. 7, 2000

Related U.S. Application Data
(60) Provisional application No. 60/143,192, filed on Jul. 9, 1999.

(51) Int. Cl.[7] .............................................. B01D 61/36
(52) U.S. Cl. ..................... 95/50; 95/281; 96/4; 96/233; 210/500.27; 210/500.36; 210/640
(58) Field of Search ........................... 95/50, 281; 96/4, 96/12, 228, 233; 210/500.27, 500.36, 640

(56) References Cited

U.S. PATENT DOCUMENTS

| | | | | |
|---|---|---|---|---|
| 5,281,255 A | * | 1/1994 | Toy et al. ...................... | 96/4 X |
| 5,290,452 A | * | 3/1994 | Schucker ..................... | 210/640 |
| 5,501,722 A | * | 3/1996 | Toy et al. ....................... | 95/50 |
| 5,630,970 A | | 5/1997 | Pinnau et al. .................. | 264/83 |
| 5,755,967 A | | 5/1998 | Meagher et al. ............. | 210/640 |
| 6,273,937 B1 | * | 8/2001 | Schucker ..................... | 95/50 X |

FOREIGN PATENT DOCUMENTS

| | | |
|---|---|---|
| JP | 58-45712 | 3/1983 |
| JP | 58045712 | 3/1983 |
| JP | 62250907 | 10/1987 |
| JP | 01207101 | 8/1989 |
| JP | 04193333 | 7/1992 |
| JP | 05103957 | 4/1993 |
| JP | 08281081 | 10/1996 |

OTHER PUBLICATIONS

Copy of website www.osmonics.com/products/p. 835, Oct. 17, 2001.

Fadeev et al., "Fouling of poly [-1(trimethylsilyl)-1-propyne] membranes in pervaporative recovery of butanol from aqueous solutions and ABE fermentation broth", *J. Mem. Sci.*, Jul. 1999, pp. 133–144, vol. 173, Elsevier Science.

International Search Report, PCT/US00/18645, Oct. 30, 2000.

Nagai et al., Abstract of "Effects of aging of molecular motion on p0oly(1-trimethylsilyl-1-propyne) membrane synthesize using various catalysyts", *J. Poly.*, Chemical Abstracts Service No. 125:277806 CA, 1996, vol. 28, No. 10.

(List continued on next page.)

*Primary Examiner*—Richard L. Chiesa
(74) *Attorney, Agent, or Firm*—Senniger, Powers, Leavitt & Roedel

(57) ABSTRACT

A novel process for the regeneration of PTMSP membranes is disclosed. The regeneration process includes washing a fouled PTMSP membrane with a solution containing at least about 50% butanol in water for a time sufficient to increase the flux and/or selectivity of the membrane. This regeneration process with a butanol containing solution significantly improves both the flux and selectivity of the PTMSP membrane and can regenerate the flux of the PTMSP membrane to the level of a previously unused membrane.

17 Claims, 5 Drawing Sheets

OTHER PUBLICATIONS

Volkov et al., Abstract of "Development of novel poly(trimethylsilyl–1–propyne) based materials for pervaporation separation in biofuel production", *Poly. Mater. Sci. Eng.*, Chemical Abstracts Service No. 127:235285 CA, 1997, vol. 77.

Fadeev, A.G. et al., "Fouling of Poly[–1–(trimethylsilyl)–1–propyne] Membranes in Pervaporative Recovery of Butanol From Aqueous Solutions and ABE Fermentation Broth", *Journal of Membrane Science*, vol. 173, pp. 133–144, 2000.

Cameron–Roda, G., "Performances of Filled And Unfilled PTMSP Membranes In Pervaporation", *Chem. Eng. Comm.*, vol. 163, pp. 3–22, 1998.

Consolati, G. et al., "Positron Annihilation Lifetime (PAL) in Poly[1–(trimethylsilyl)propine](PTMSP): Free Volume Determination And Time Dependence of Permeability", *Journal of Polymer Science: Part B: Polymer Physics*, vol. 34, pp. 357–367, 1996.

Nagai, K. et al., "Gas Permeability And Stability of Poly(1–Trimethylsilyl–1–Propyne–co–1–Phenyl–1–Propyne) Membranes", *Journal of Polymer Science: Part B: Polymer Physics*, vol. 33, pp. 289–298, 1995.

Kang, Yong Soo et al., "Composite Membranes of Poly(1–trimethlsilyl–1–propyne) and Poly(dimethyl Siloxane) And Their Pervaporation Properties For Ethanol–Water Mixture", *Journal of Applied Polymer Science*, vol. 53, pp. 317–323, 1994.

Robeson, L.M. et al., "High Performance Polymers For Membrane Separation", *Polymer*, vol. 35, No. 23, pp. 4970–4978, 1994.

Hickey, P.J. et al., "The Effect Of Process Parameters On The Pervaporation Of Alcohols Through Organophilic Membranes", *Separation Science and Technology*, vol. 27(7), pp. 843–861, 1992.

Mori, Yutaka et al., "Ethanol Production From Starch In A Pervaporation Membrane Bioreactor Using *Clostridium Thermohydrosulfuricum* ", *Biotechnology and Bioengineering*, vol. 36, pp. 849–853, 1990.

Langsam, Michael et al., "Substituted Propyne Polymers –Part II. Effects of Aging On The Gas Permeability Properties of Poly(1–(trimethylsilyl)Propyne For Gas Separation Membranes", *Polymer Engineering and Science*, vol. 29, No. 1, pp. 44–54, 1989.

Asakawa, S. et al., "Composite Membrane Of Poly[trimethylsilyl)–propyne] As A Potential Oxygen Separation Membrane", *Gas Separation & Purification*, vol. 3, pp. 117–122, 1989.

Fujii, Yoshishige et al., "Separation Of Alcohol–Water Mixtures Through Poly(1–trimethylsilyl–1–propyne) Membranes And Hydorphobic Porous Membranes", pp. 71–74, Undated.

Volkov, V.V. et al., "Organophilic Polymers For Pervaporation", A.V. Topchiev Institute of Petrochemical Synthesis, The USSR Academy of Sciences, pp. 169–173, Undated.

* cited by examiner

POLY (1-TRIMETHYSILYL-1-PROPYNE) MEMBRANE REGENERATION PROCESS

This application claims priority to co-pending U.S. provisional patent application Ser. No. 60/143,192, filed Jul. 9, 1999, incorporated herein by reference.

BACKGROUND OF THE INVENTION

The present invention relates to a process for regenerating a poly(1-trimethylsilyl-1-propyne) membrane. More particularly, the present invention relates to a process for regenerating a poly(1-trimethylsilyl-1-propyne) membrane used in a pervaporation process for recovering volatile organic compounds such as n-butanol from aqueous solutions and/or fermentation broths.

It is known that membranes comprised of glassy polymers such as poly(1-trimethylsilyl-1-propyne) (PTMSP) are highly effective in the separation of volatile organic compounds such as n-butanol from aqueous liquid streams and fermentation broths such as acetone butanol ethanol (ABE) fermentation broths in a pervaporation process.

Pervaporation is a common separation technique wherein liquid volatile organic compounds such as n-butanol are preferentially transported and separated across a thin membrane film supported by a porous support structure which provides mechanical strength. The feed side of the membrane is contacted by the aqueous liquid containing the volatile organic compound, while a vacuum or sweep gas is applied on the permeate side of the membrane as a driving force to selectively transport components of the liquid through the membrane. The volatile organic compounds are collected on the permeate side of the membrane by condensation in a cold trap. Two characteristics of the PTMSP membrane define the membrane's effectiveness in the separation of volatile organic compounds such as n-butanol in a pervaporation process: selectivity toward the desired species to be separated and flux or flow rate of the desired species through the membrane. Flux is generally defined as the rate at which desired products contained in a feed solution pass through the membrane and is generally reported in $g/m^2h$.

When separating n-butanol from an aqueous solution a fermentation broth selectivity is defined as the ratio of the butanol:water concentration of the permeate to that of the retentate:

$$\text{selectivity} = \text{permeate}(C_{butanol}/C_{water})/\text{retentate}(C_{butanol}/C_{water})$$

where the permeate is what crosses the membrane and the retentate is the feed solution concentrate, or what is retained on the feed side of the membrane and recirculated to the feed tank. Higher selectivity translates into a more pure permeate with higher separation efficiencies.

In a pervaporation process utilizing a PTMSP membrane, there are two separate steps involved in the removal of volatile organic compounds such as n-butanol from an aqueous solution or fermentation broth. The first step involves the sorption of the volatile compound into the membrane. The second step is the diffusion of the volatile through the membrane due to a driving source such as a vacuum which creates a concentration gradient. To enhance membrane performance and increase efficiency, selective sorption of the volatile must be increased and/or diffusion resistance must be reduced, or both.

Although PTMSP membranes are highly effective in recovering n-butanol from aqueous solutions or fermentation broths due their high selectivities and high flux rate, these advantageous characteristics deteriorate over time as the membrane becomes fouled and/or compacted. This deterioration occurs quickly in the presence of ABE fermentation broth and the membrane becomes unsuitable for use within a short period of time. Because constantly replacing fouled PTMSP membranes is cost-prohibitive and time consuming, a need exists for a simple method of cleaning or regenerating PTMSP membranes such that a single membrane may be cleaned or regenerated and reused numerous times.

SUMMARY OF THE INVENTION

Among the objects of the present invention, therefore, are the provision of a simple, cost-effective process for regenerating a fouled PTMSP membrane; the provision of using a butanol-containing liquid as a washing agent to clean and regenerate a fouled PTMSP membrane; the provision of a process for increasing the efficiency of butanol separation from fermentation broth or an aqueous stream using a PTMSP membrane; and the provision of a process for regenerating a fouled PTMSP membrane utilizing a product stream separated by the membrane.

Briefly, therefore, the present invention is directed to a process for regenerating a poly(1-trimethylsilyl-1-propyne) membrane having a feed side and a permeate side. The process comprises contacting the feed side of the membrane with an aqueous cleaning solution containing at least about 50% by volume butanol.

The invention is further directed to a separation process utilizing a poly(1-trimethylsilyl-1-propyne) membrane having a feed side and a permeate side. The process comprises contacting the feed side of the membrane with a feed solution containing a volatile organic compound while applying a driving force across the membrane to cause components of the feed solution to permeate the membrane and form a permeate having an organic phase and an aqueous phase. The membrane is regenerated by contacting the feed side of the membrane with an aqueous cleaning solution containing at least about 50% by volume butanol The invention is further directed to a separation process utilizing a poly(1-trimethylsilyl-1-propyne) membrane having a feed side and a permeate side. The process comprises contacting the feed side of the membrane with a feed solution comprising ABE fermentation broth while applying a driving force across the membrane to cause components of the feed solution to permeate the membrane comprised of an organic phase and an aqueous phase until the flux of the membrane has decreased by about 50% of its original. Next, the feed side of the membrane is contacted with a pre-cleaning solution to remove any debris or media from the feed side. Finally, the feed side of the membrane is contacted with a cleaning solution containing at least about 80% butanol in water by volume to cause the cleaning solution to permeate the membrane.

Other objects and features of this invention will be in part apparent and in part pointed out hereinafter.

DETAILED DESCRIPTION OF THE PREFERRED EMBODIMENTS

In accordance with the present invention, it has been discovered that a PTMSP membrane suitable for use in a pervaporation process to recover volatile organic compounds such as n-butanol from aqueous solutions and fermentation broths can be regenerated and reused after fouling several times without a significant reduction in selectivity or flux by washing the membrane with a cleaning solution comprising butanol and water. Advantageously, when butanol is being recovered from an aqueous stream or fermentation broth, the organic phase of the permeate collected through pervaporation can be used as the cleaning solution to regenerate the PTMSP membrane such that it achieves a selectivity and flux rate almost equal to a previously unused PTMSP membrane in a short period of time without removing the membrane from the pervaporation apparatus. Alternatively, the aqueous cleaning solution containing butanol can be prepared separately and can be washed across the membrane to remove the fouling and regenerate the membrane.

Figure 1:
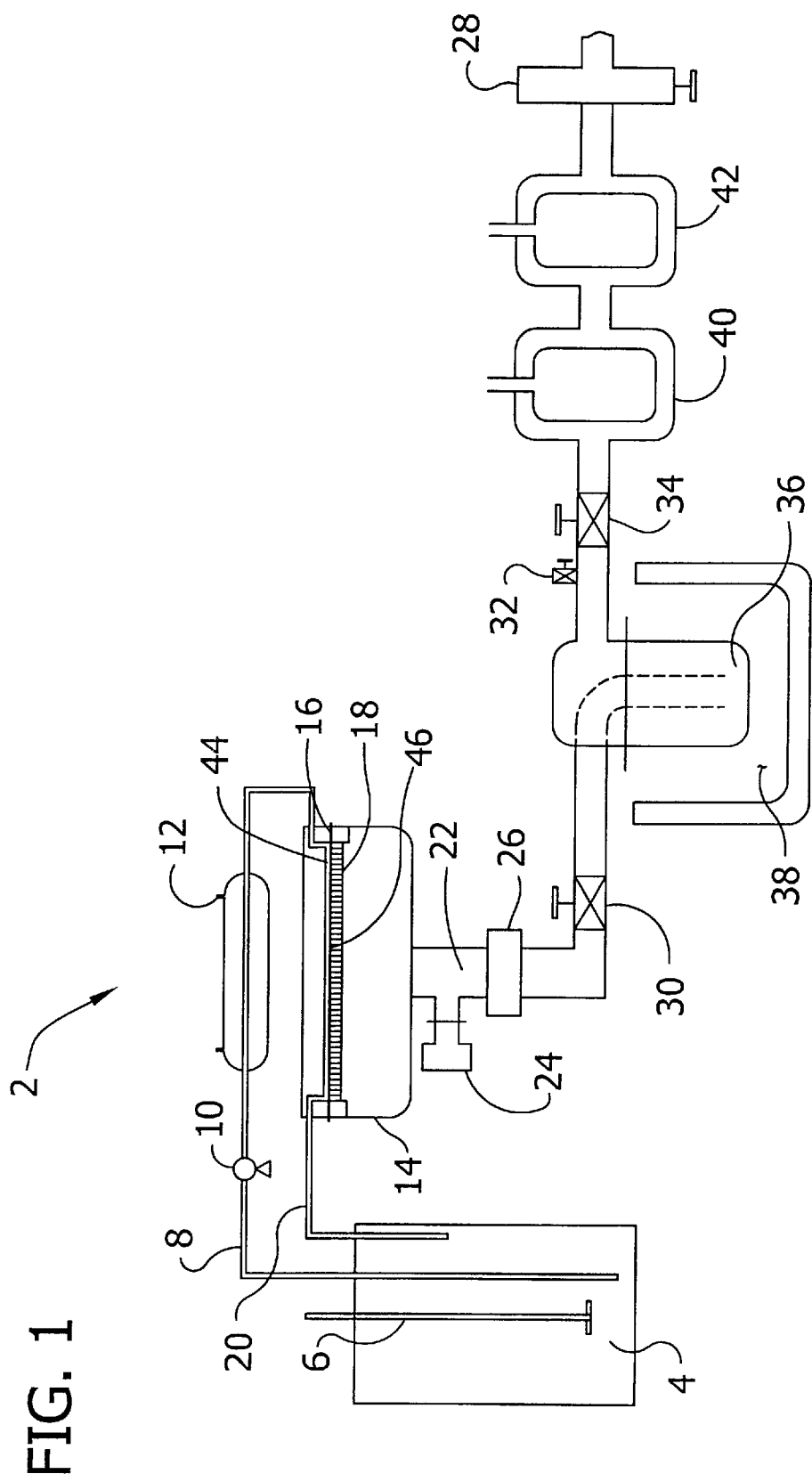
FIG. 1 is a schematic diagram of a pervaporation apparatus which can be used in accordance with the regeneration process of the present invention.

Referring now to the Figures, and more particularly to FIG. 1, there is shown a pervaporation apparatus 2 suitable for use with the PTMSP membrane regeneration process of the present invention. The apparatus 2 comprises an agitated feed tank 4 having a mixing arm 6. Liquid solutions to be separated are pumped from the feed tank 4 to a membrane cell 14 through feed line 8 by pump 10. Heat exchanger 12 is capable of heating the feed solution to a desired temperature before it enters the membrane cell.

The membrane cell 14 contains PTMSP membrane 16 which rests on porous support member 18. PTMSP membrane 16 has feed side 44 and permeate side 46. Liquid solution pumped into the membrane cell 14 contacts feed side 44 of PTMSP membrane 16. The retentate solution which is not absorbed onto the PTMSP membrane 16 passes from the membrane cell back into feed tank 4 through a return line 20. The permeate passes through the PTMSP membrane and flows from the membrane cell into line 22. Line 22 contains vacuum gauge 24, throttling valve 26, and vacuum valves 30, 32, and 34 for monitoring and adjusting the vacuum maintained on the permeate side of the PTMSP membrane by vacuum pump 28.

The permeate is collected in permeate cold trap 36 which is cooled by bath 38 which may be, for example, a dry ice/ethanol bath. Vapor traps 40 and 42 are located between cold trap 36 and vacuum pump 28 to collect any vapors which pass through the cold trap so the vapors to do enter and contaminate or foul the vacuum pump.

In accordance with the present invention, a feed solution, such as ABE fermentation broth or an aqueous solution containing volatile organic compounds, contained in the feed tank is heated and pumped through the pervaporation apparatus and contacts the PTMSP membrane on the feed side of the membrane while the vacuum pump is engaged. A portion of the solution, the permeate, passes through the membrane and is collected downstream. The permeate contains the desired solutions being recovered, such as n-butanol. The permeate may also contain other volatile organic compounds such as, for example, acetone and ethanol. The remaining solution, the retentate, is returned to the feed tank for re-circulation through the feed line and again across the PTMSP membrane.

PTMSP membranes regenerated using the process of the present invention may be dense film-type membranes (isotropic) or skin-type membranes (anisotropic) and typically have a thickness which provides a high flux rate with a low amount of defects on the membrane surface induced by the membrane being too thin. Typically, PTMSP membranes may have a thickness of between about 500 Angstroms and about 2000 Angstroms or more. When the feed solution is ABE fermentation broth a thin, previously unused PTMSP membrane can have a flux rate of up to about 1000 $g/m^2h$, and when used to separate volatile organic compounds from an aqueous solution, a PTMSP membrane can have an initial flux rate of up to about 7000 $g/m^2h$. For n-butanol, selectivities up to about 70 to about 80 have been achieved with a PTMSP membrane. As the pervaporation process continues and more and more feed solution contacts the PTMSP membrane, the membrane begins to foul due to contamination with debris and products of fermentation and compaction and its flux rate and selectivity begin to deteriorate. The flux rate of PTMSP membranes in the presence of feed solutions containing volatile organic compounds, such as aqueous streams or ABE fermentation broth, begins to decrease drastically after several hours of use, significantly decreasing the efficiency of the pervaporation process. For thinner PTMSP membranes, it is not uncommon for flux rate to be reduced to half of its original value after about 20 hours of use, thus making the PTMSP membrane much less desirable for separation and significantly increasing the costs associated with the recovery of desired products.

In accordance with the regeneration process of the present invention, a fouled PTMSP membrane can by cleaned and regenerated such that its flux and/or selectivity for volatile organic compounds are significantly improved so that it may be reused in a pervaporation process. Several factors influence the amount of time the regenerating process should be carried out to gain maximum improvement in membrane flux and selectivity. These factors include the degree of foulness of the PTMSP membrane, i.e., what percentage drop in flux rate and selectivity has occurred during the pervaporation process; the concentration of butanol in the cleaning solution; and the temperature of the cleaning solution and the PTMSP membrane.

Typically, the regeneration process of the present invention is not initiated until the flux and/or the selectivity of the PTMSP membrane has been reduced to at least about 75% of its original value, more preferably at least about 60% of its original value, and most preferably about 50% of its original value. If the regeneration process of the present invention is initiated prior to the PTMSP membrane be sufficiently fouled, the overall efficiency of the pervaporation process may be minimized as the pervaporation process must be interrupted for the regeneration process to be initialized.

Once the flux rate and/or the selectivity of the PTMSP membrane has dropped to an unacceptable level, the membrane is regenerated by feeding an aqueous cleaning solution containing at least about 50% butanol by volume, more preferably at least about 60% butanol by volume, more preferably at least about 70% butanol by volume, and most preferably at least about 80% butanol by volume to the membrane cell. The temperature of the aqueous butanol cleaning solution is typically between about 20° C. and about 50° C., preferably between about 30° C. and about 40° C. During the regeneration process, it is preferred that the driving force such as a vacuum be discontinued and the cleaning solution simply contact the feed side of the membrane at atmospheric pressure. Some of the cleaning solution will permeate and pass through the membrane and is collected in the cold trap. The majority of the cleaning solution will be returned to the feed tank where it can be re-circulated across the membrane.

As previously mentioned, the degree of foulness of the PTMSP membrane, the concentration of butanol in the cleaning solution, and the temperature of the cleaning solution and the membrane impact the regeneration process. As such, the time required for the regeneration process is dependent upon these factors. Typically, the regeneration process utilizing the butanol cleaning solution should for a time sufficient to increase the flux rate and/or the selectivity of the fouled membrane by at least about 25%, more preferably at least about 50%, still more preferably at least about 75%, still more preferably at least about 100%, and most preferably at least about 110%. The efficiency of the regeneration process may be increased by first contacting the feed side of the membrane with a pre-cleaning solution such as deionized water prior to wash away any culture, media, or other debris present on the feed side of the membrane which may be restricting the flow of the feed liquid. Such a pre-cleaning may facilitate better flow of the butanol solution through the membrane and decrease the required regeneration time.

Without being bound to a particular theory, it is believed that the butanol-containing cleaning solution may solubilize numerous contaminants in and on the PTMSP membrane such as lipids that foul the PTMSP membrane and allow these contaminants to be removed from the membrane. Some contaminants located on the surface of the membrane or within the membrane itself, which may or may not be solubilized by the cleaning solution may have a greater affinity for the butanol in the cleaning solution than for the PTMSP polymer, thereby allowing removal of the contaminant from the membrane as the cleaning solution is washed across and permeates the membrane. The butanol solution also reduces the amount of compaction of the fouled PTSMP membrane during the regeneration process as the butanol interacts and re-swells the membrane.

In a preferred embodiment of the present invention, when a fermentation broth such as an ABE broth is used at the feed solution such that butanol is the major organic constituent of the permeate, the organic phase of the permeate is utilized as the butanol containing cleaning solution to regenerate the fouled PTMSP membrane. When ABE fermentation broth is used as the feed solution the permeate consists of an organic phase and an aqueous phase. The organic phase typically contains about 80% butanol in water by volume at room temperature. A portion of this organic phase of the permeate can be transferred from the cold trap into a separate feed tank and utilized as the cleaning solution to regenerate the membrane and thus negate any need for importing a cleaning solution into the process. Permeate from the 80% butanol in water cleaning solution which passes through the PTMSP membrane will be collected in the permeate trap. Any regenerating solution which does not pass through the PTMSP membrane will be returned to the feed tank for the cleaning solution and can be collected or redeposited in the permeate trap. As such, this regeneration process cleans and regenerates the PTMSP membrane without significant loss of collected butanol product.

The present invention is illustrated by the following examples which are merely for the purpose of illustration and is not to be regarded as limiting the scope of the invention or manner in which it may be practiced.

EXAMPLE 1

PTMSP Membrane Preparation

The PTMSP membrane utilized in the pervaporation process throughout in the following Examples was prepared by dissolving $TaCl_5$ (0.2 mmol) in toluene (5 mL) at room temperature. 1-(trimethylsilyl)-1-propyne monomer (12 mmol) was added to the $TaCl_5$/Toluene solution and the mixture agitated for 12 hours at room temperature. After 12 hours, polymerization was terminated by adding a methanol/toluene mixture (10 mL, 1:4 by volume). The polymer was dissolved in toluene (100 mL) and precipitated in methanol (1 L). The precipitated polymer was filtered off and dried.

A polymer film suitable for use as a PTMSP membrane having a thickness of about 30 micrometers was fabricated by preparing a mixture of the PTMSP polymer in toluene (3% by weight) and spreading the mixture on a glass plate using a casting knife. The polymer solution was air dried at ambient temperature for three days. The polymer membrane was peeled off the glass plate by applying deionized water at the polymer/glass interface and was suitable for use as a PTMSP membrane.

EXAMPLE 2

Flux and Separation Factor Analysis of PTMSP Membrane in Pervaporation Process

Flux and separation factor were monitored as the PTMSP membrane prepared in Example 1 was subjected to various feed solutions in a pervaporation process. Pervaporation was conducted on the apparatus set forth in FIG. 1 described above. The feed solution was circulated through the membrane cell by the pump at a rate of about 1.2–1.3 L/minute. The temperature of the feed solution was controlled with the heat exchanger and was held constant at about 37° C. The PTMSP membrane was sealed between a polyethylene support plate and the upper cell manifold using a Buna O-ring. The active PTMSP membrane area was about 110 cm$^2$. A vacuum was pulled directly under the membrane (0.01 Torr) using a Kinney KTC-112 vacuum pump. Vacuum traps for collecting the permeate were cooled with a dry ice/ethanol mixture. The flux of the PTMSP membrane was determined by weighing the collected permeate, and the feed and collected permeate were analyzed by gas chromatography using a Shimadzu 17A gas chromatagraph with Stabilwax 15 ft, 0.53 ID capillary column and a flame ionization detector. Collected permeate consisting of two phases (organic and aqueous) was diluted to a homogeneous solution prior to gas chromatography analysis.

The fresh PTMSP membrane was first subjected to a feed solution consisting of 20 g/L BuOH/water mixture for a period of about 18 hours. Next, the membrane was subjected to a feed solution of 20 g/L BuOH/water mixture containing media for about 10 hours. Next, the membrane was subjected to a feed solution of 20 g/L BuOH/ water mixture containing media concentration of yeast extract, bacto peptone, glucose, and by-products such as acetone (3.5 g/L), ethanol (1 g/L), acetic acid (0.6 g/L), and butyric acid (0.7 g/L) for about 7 hours until the flux rate of the PTMSP membrane had declined to about 50% of its original rate (about 35 hours).

When the flux was 50% of its original rate, the permeate collected contained about 55%–57% butanol. At this point, about 500 mL of an 80% butanol in water cleaning solution was circulated through the membrane cell for a period of about 4 minutes. The cleaning solution was washed off of the cell with deionized water. Finally, the membrane performance after regeneration was evaluated with a 20 g/L butanol/water feed mixture for about 10 hours.

Figure 2:
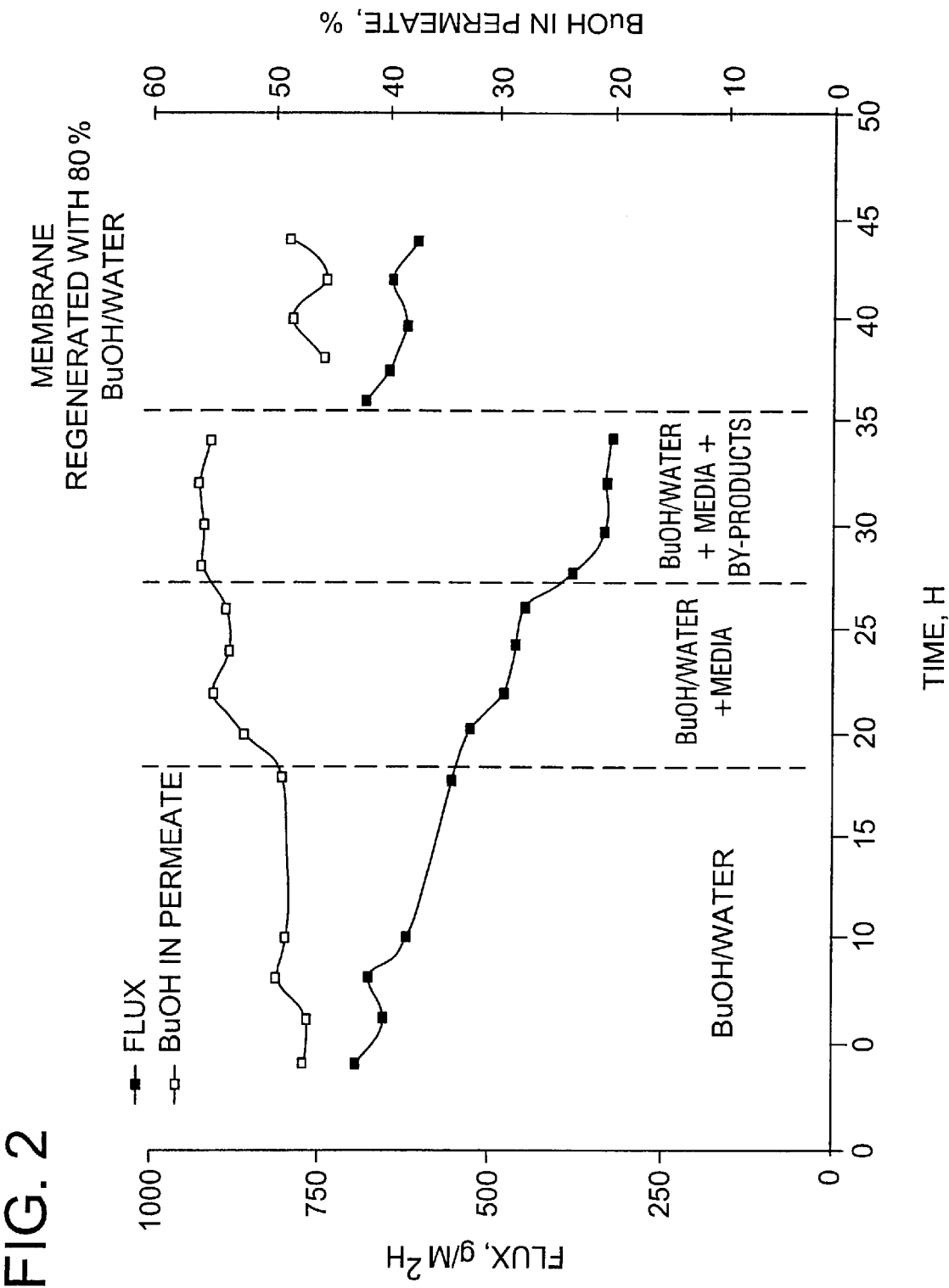
FIGS. 2, 3, 4, and 5 are graphs showing flux and percentage of butanol in permeate in a pervaporation process utilizing a PTMSP membrane under various fouling conditions before and after the PTMSP membrane regeneration process of the present invention.

The results of this Example are shown in FIG. 2. The first 5 data points show results for the initial butanol/water feed solution and show the permeate to contain about 50% butanol and the flux rate which initially was about 700 gm²h dropped slowly over the 18 hour period. The next 4 data points correspond to the butanol/water/media feed solution and indicate that the percentage of butanol in the permeate increases to about 55% and the flux decreases sharply to below 500 g/m²h. The next 4 data points correspond to the butanol/water/media/by-products feed solution and show a selectivity of about 57%–58% and a flux which has decreased to about 350 gm²h. Finally, the last 5 data points correspond to a feed solution of 20 g/L butanol in water and were collected after the regeneration washing of the PTMSP membrane with a solution of about 80% butanol in water and show a substantial increase in the flux rate of the PTMSP membrane almost to its original level.

EXAMPLE 3

Flux and Separation Factor Analysis in Abe Fermentation Broth

The same membrane synthesized in Example 1 and utilized in Example 2 was utilized in this Example 3 in the pervaporation apparatus under identical conditions to those set forth in Example 2. Two separate feed solutions of ABE fermentation broth containing 0.5 g/L acetone, 0.2 g/L ethanol, 20 g/L butanol, 1.4 g/L acetic acid, and 0.9 g/L butyric acid were utilized. The concentration of butanol in the ABE fermentation broth was adjusted to 20 g/L to make the data gathered comparable to Example 2.

Figure 3:
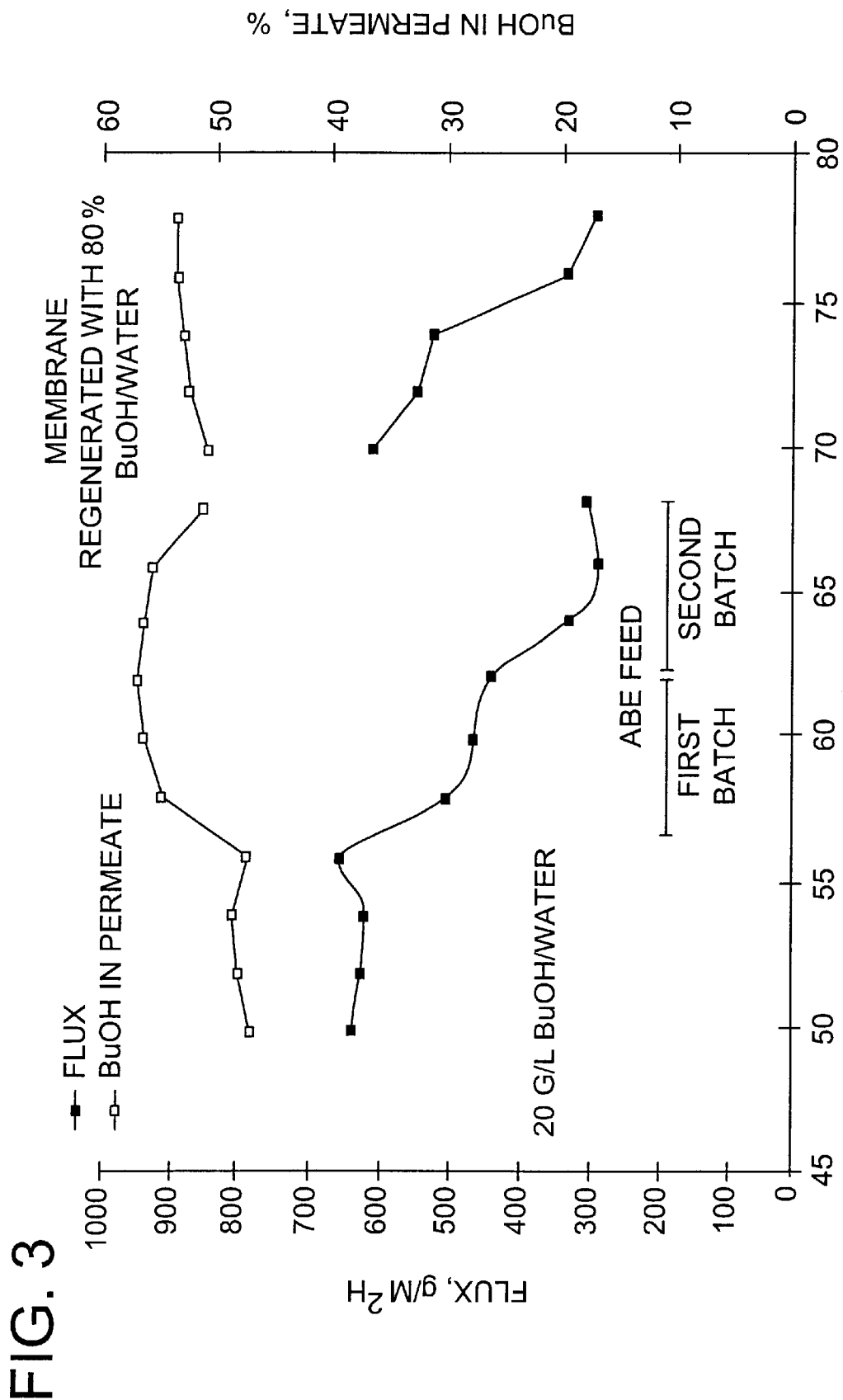

As indicated in FIG. 3, the first 4 data points were collected with a feed solution of 20 g/L butanol in water and show a flux rate of about 620 gm²h and about 50% butanol in the permeate. The next 3 data points correspond to the first ABE fermentation broth feed solution and show an increase in the selectivity up to about 57%–58% butanol in the permeate and a decrease in the in the flux down to about 400 gm²h after about 5 hours. The next 3 data points correspond to the second ABE fermentation broth feed solution and show about the same percent of butanol in the permeate and a still further drop in the flux below 300 gm²h. The final 3 data points correspond to a feed solution of 20 g/L butanol in water solution introduced as feed solution after the membrane was regenerated by washing with deionized water any culture buildup on the membrane and circulating about 500 m/L of 80% butanol in water for about 5 minutes. After the regeneration procedure, the flux was returned to almost its original level.

EXAMPLE 4

Reproducibility of Regeneration of PTMSP Membrane

In this Example, the reproducibility of regeneration of the PTMSP membrane was analyzed. The same PTMSP membrane synthesized in Example 1 and utilized in Examples 2 and 3 was used in this Example under the same pervaporation conditions as set forth in Example 2.

Figure 4:
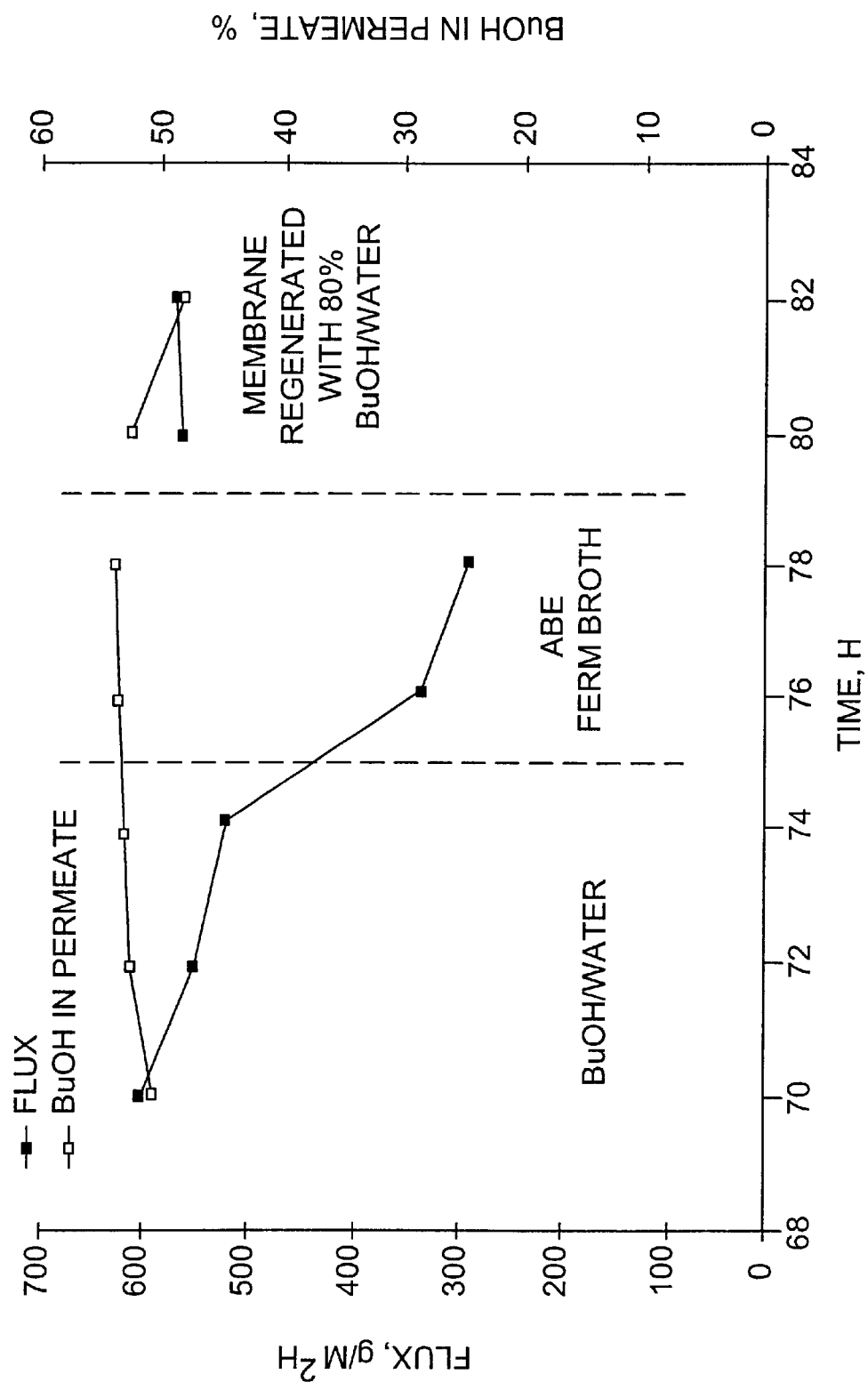

After regenerating the PTMSP membrane as described in Example 3 at about 68 hours, a feed solution of 20 g/L of butanol in water was used as a feed solution up to about 74 hours (first 3 data points) as shown in FIG. 4. At 74 hours, ABE fermentation broth which contained 0.276 g/L acetone, 0.14 g/L ethanol, 20 g/L butanol, 2 g/L acetic acid, and 1.4 g/L butyric acid was utilized as the feed solution. The next 2 data points correspond to the ABE fermentation broth and show a substantial decrease in flux to below about 300 gm²h. After about the 78th hour the membrane was again regenerated by washing it with deionized water and then with 500 mL of a 80% butanol in water solution for 5 minutes. The last two point correspond to a feed solution of 20 g/L of butanol in water after regeneration and show that the flux was returned to almost its original level.

EXAMPLE 5

Figure 5:
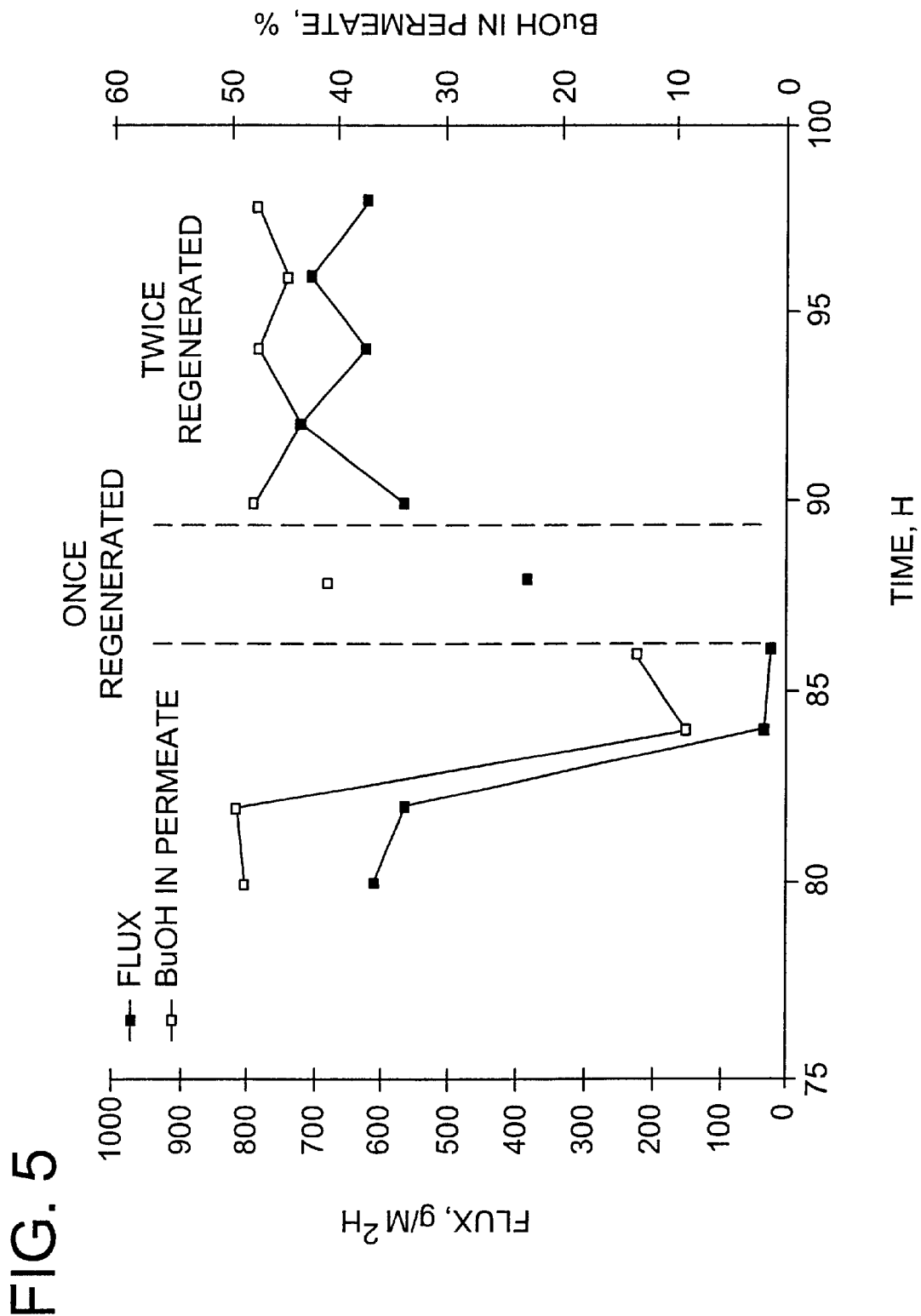

Membrane Regeneration After Fouling with Sodium Salts of Palmitic and Stearic Acids After regenerating the PTMSP membrane as described in Example 4 at about 78 hours, a feed solution of 20 g/L of butanol in water was used as feed solution up to about 82 hours (first 2 data points) as shown in FIG. 5. At 82 hours, a 1:1 mixture of sodium salts of stearic and palmitic acids (0.001 mol/L) was added to the 20 g/L butanol in water feed solution. As the next 2 data points in FIG. 5 indicate, both selectivity and flux dropped very quickly in the presence of these acids. After about 86 total hours, the PTMSP membrane was regenerated by washing the membrane off with deionized water and washing the membrane with 200 mL of a solution containing 80% butanol in water for 5 minutes. After this first regeneration, the feed solution was changed to a solution of 20 g/L of butanol in water and the flux and selectivity increased dramatically after the regeneration. After about 5 hours after the first regeneration procedure, a second regeneration procedure identical to the first was performed on the PTMSP membrane and the feed solution of 20 g/L of butanol in water was again utilized. The final 5 data points correspond the 20 g/L of butanol in water feed solution after the second regeneration procure and show a further dramatic increase in selectivity and flux. After almost 100 hours of use, the PTMSP membrane continued to have a very high flux rate almost identical to the flux rate it possessed when new.

In view of the above, it will be seen that the several objects of the invention are achieved. As various changes could be made in the above-described PTMSP membrane regeneration process without departing from the scope of the invention, it is intended that all matter contained in the above description be interpreted as illustrative and not in a limiting sense.

What is claimed is:

1. A process for regenerating a poly(1-trimethylsilyl-1-propyne) membrane used in a pervaporation separation method, the membrane having a feed side and a permeate side, the process comprising contacting the feed side of the membrane with an aqueous cleaning solution containing at least about 50% by volume butanol.

2. The process as set forth in claim 1 wherein the aqueous cleaning solution contains at least about 60% by volume butanol.

3. The process as set forth in claim 2 wherein the aqueous cleaning solution contains at least about 70% by volume butanol.

4. The process as set forth in claim 3 wherein the aqueous cleaning solution contains at least about 80% by volume butanol.

5. The process as set forth in claim 1 wherein the feed side of the membrane is contacted with a pre-cleaning solution to remove debris from the feed side of the membrane prior to contacting the feed side of the membrane with the aqueous cleaning solution.

6. The process as set forth in claim 1 wherein the flux of the membrane after regeneration is increased by at least about 25%.

7. The process as set forth in claim 6 wherein the flux of the membrane after regeneration is increased by at least about 75%.

8. The process as set forth in claim 7 wherein the flux of the membrane after regeneration is increased by at least about 100%.

9. The process as set forth in claim 8 wherein the flux of the membrane after regeneration is increased by at least about 110%.

10. A pervaporation separation process utilizing a poly (1-trimethylsilyl1-propyne) membrane, the membrane having a feed side and a permeate side, the process comprising:

contacting the feed side of the membrane with a feed solution containing a volatile organic compound while applying a driving force across the membrane to cause components of the feed solution to permeate the membrane and form a permeate comprising an organic phase and an aqueous phase; and contacting the feed side of the membrane with an aqueous cleaning solution containing at least about 50% by volume butanol.

11. The process as set forth in claim 10 wherein the feed side of the membrane is contacted with the aqueous cleaning solution after the flux of the membrane has been reduced to 50% of its original value.

12. The process as set forth in claim 10 wherein the feed solution comprises ABE fermentation broth.

13. The process as set forth in claim 10 wherein the aqueous cleaning solution contains at least about 80% by volume butanol.

14. The process as set forth in claim 10 wherein the feed side of the membrane is contacted with a pre-cleaning solution to remove debris from the feed side of the membrane prior to contacting the feed side of the membrane with the aqueous cleaning solution.

15. The process as set forth in claim 10 wherein the flux of the membrane after contacting the feed side of the membrane with the cleaning solution is increased by at least about 100%.

16. A pervaporation separation process utilizing a poly (1-trimethylsilyl-1-propyne) membrane, the membrane having a feed side and a permeate side, the process comprising:

contacting the feed side of the membrane with a feed solution comprising ABE fermentation broth while applying a driving force across the membrane to cause components of the feed solution to permeate the membrane and form a permeate comprising an organic phase and an aqueous phase until the flux of the membrane has decreased by about 50% from its original value;

contacting the feed side of the membrane with a pre-cleaning solution to remove debris from the feed side of the membrane; and contacting the feed side of the membrane with an aqueous cleaning solution containing at least about 80% by volume butanol.

17. The process as set forth in claim 16 wherein the aqueous cleaning solution contacting the feed side of the membrane comprises the organic phase of the permeate.

* * * * *